J. BADAGLIACCA.
SAFETY SEAT FOR WINDOW CLEANERS.
APPLICATION FILED FEB. 21, 1922.
1,437,484.
Patented Dec. 5, 1922.
3 SHEETS—SHEET 1.
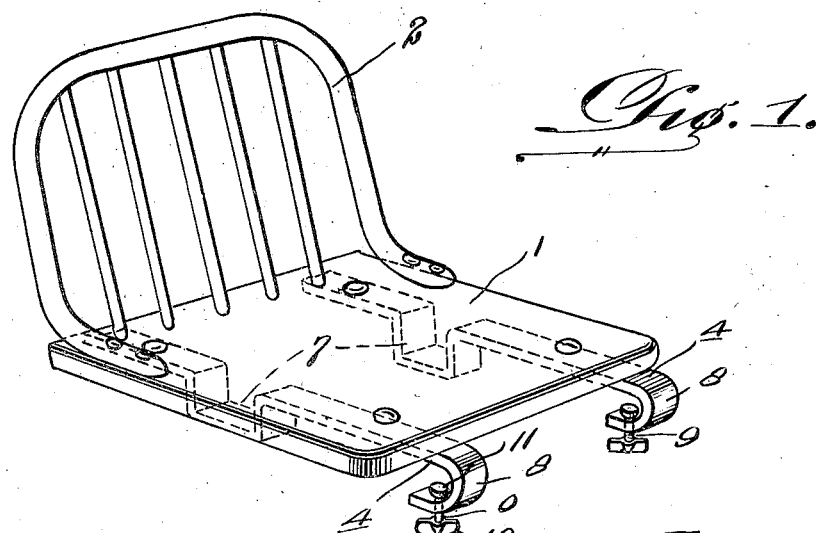
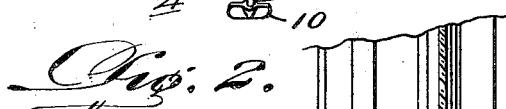
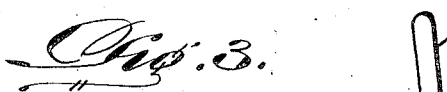
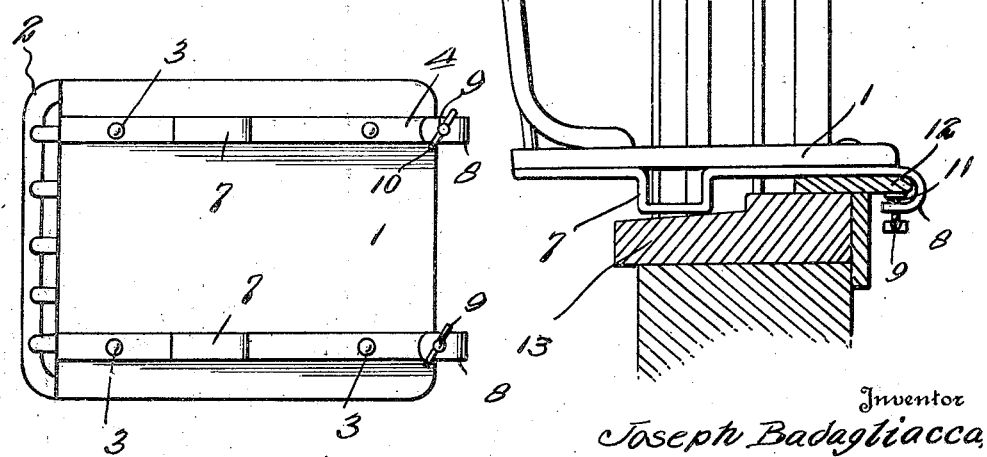
Inventor
Joseph Badagliacca,
Witnesses:—
William Thickstun
Laurence Schlosser
By Clarence A. O'Brien
Attorney J. BADAGLIACCA.
SAFETY SEAT FOR WINDOW CLEANERS.
APPLICATION FILED FEB. 21, 1922.

Inventor
Joseph Badagliacca,

Witnesses:—

J. BADAGLIACCA.
SAFETY SEAT FOR WINDOW CLEANERS.
APPLICATION FILED FEB. 21, 1922.
1,437,484.
Patented Dec. 5, 1922.
3 SHEETS—SHEET 3.
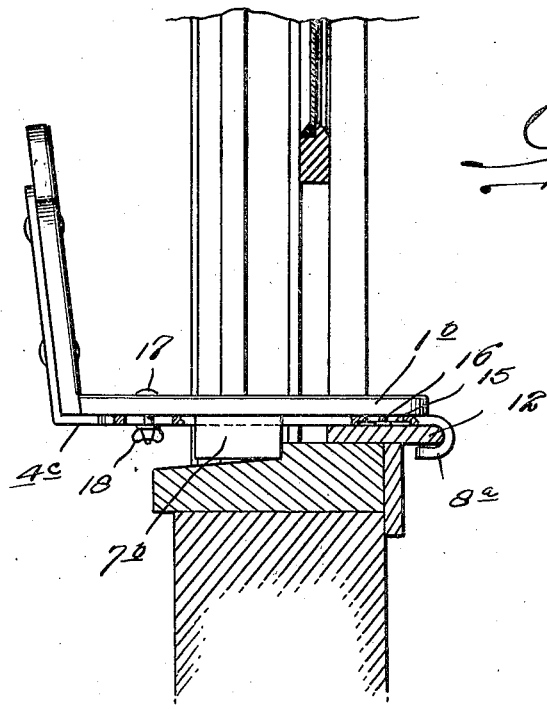
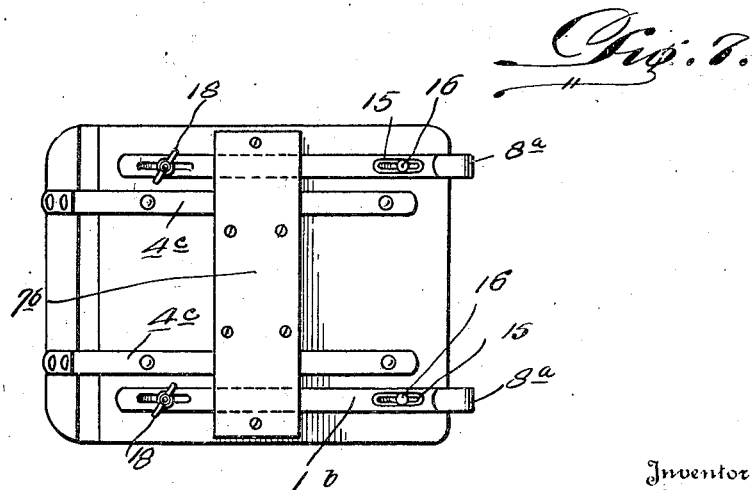
Witnesses:-
William Thicketun
Lawrence Schlosser
Inventor
Joseph Badagliacca,
By Clarence A. O'Brien
Attorney Patented Dec. 5, 1922.

1,437,484

UNITED STATES PATENT OFFICE.

JOSEPH BADAGLIACCA, OF PATERSON, NEW JERSEY.

SAFETY SEAT FOR WINDOW CLEANERS.

Application filed February 21, 1922. Serial No. 538,300.

*To all whom it may concern:*

Be it known that I, JOSEPH BADAGLIACCA, a citizen of the United States, residing at Paterson, in the county of Passaic and State of New Jersey, have invented new and useful Improvements in Safety Seats for Window Cleaners, of which the following is a specification.

The object of my said invention is the provision of a simple, light, easily-applied and safe seat for holding a window cleaner in a window casing and comfortably supporting him while at work.

To the attainment of the foregoing, the invention consists in the improvement as hereinafter described and definitely claimed.

In the accompanying drawings, forming part of this specification:—

Figure 1 is a perspective showing a safety seat of my invention.

Figure 2 is a view showing said seat in use.

Figure 3 is an inverted plan view of the seat.

Figure 6 is a view, like Figures 2 and 4, but showing another modified form of seat.

Figure 7 is an inverted plan of said seat.

Similar numerals designate corresponding parts in Figures 1 to 3 to which reference will first be made.

Figure 4:
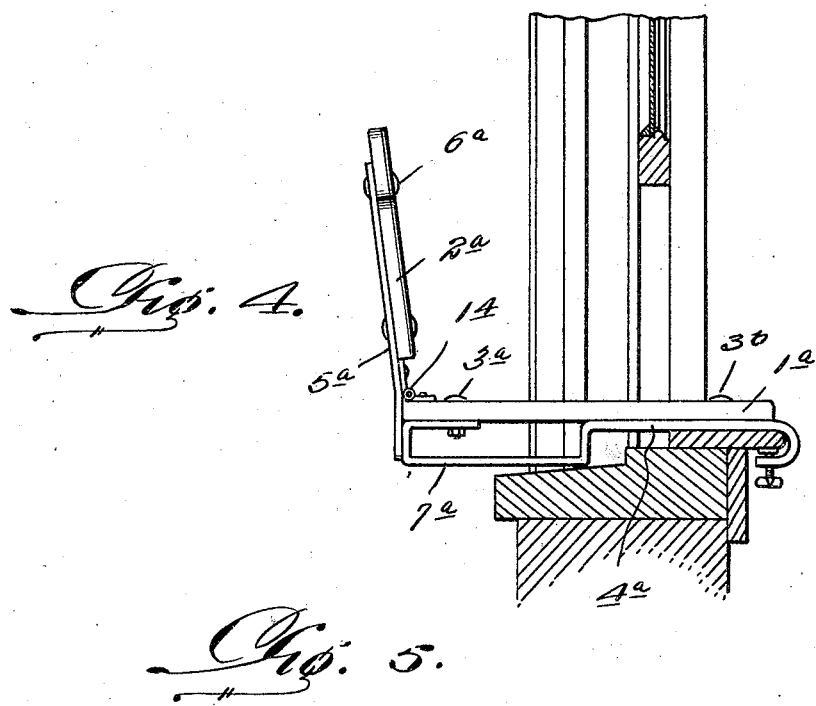
Figure 4 is a view similar to Figure 2, showing a modified seat.

My novel seat comprises a body 1, preferably of wood, and a back 2, also preferably of wood.

Arranged in parallelism under the body 1 and riveted or otherwise appropriately connected to the same at the points 3 are anchor or holding bars 4 of steel, wrought-iron or other suitable metal. Intermediate of their ends the bars 4 are bent to form pendent loop-shaped supports 7, and the inner ends of the bars are shaped into hooks 8, in the lower portions of which clamping screws 9 are threaded, said screws having handles 10 and broad bearing end portions 11.

In practice the seat is applied and fastened as shown in Figure 2—i. e., the hooks 8 are arranged to straddle and are clamped on the innermost portion 12 of a window sill, and the supports 7 are made to bear on the upper side of the outer portion 13 of the sill so as to support the seat body 1 in horizontal position while the back 2 is strongly maintained in a position outwardly beyond the window casing.

Manifestly my novel seat is adapted to be conveniently carried from place to place and quickly and easily secured in a window casing. It will also be apparent that the seat is both safe and comfortable to a cleaner working in seated position, and when it is necessary for the worker to stand up on the seat body 1, as is sometimes the case, the back 2 constitutes a guard and brace for the feet of the worker.

In the modification shown in Figures 4 and 5, the seat body $1^a$ is bolted at $3^a$ and riveted at $3^b$ to the anchor bars $4^a$ below it, and the said bars $4^a$ differ from the bars 4 of Figures 1–3, in that they have long and strong pendent supports $7^a$ adapted to rest on the outer portion 13 of a window sill and to extend outwardly beyond said portion. Also in said modification, the back $2^a$ is hingedly connected at 14 to the body $1^a$ and is riveted or otherwise connected at $6^a$ to arms $5^a$ that extend below the back $2^a$ and are adapted in use to bear against the outer edge of the body $1^a$ and the outer ends of the bar portions $7^a$ so as to strongly brace and maintain the back $2^a$ in the working position.

Figure 5:
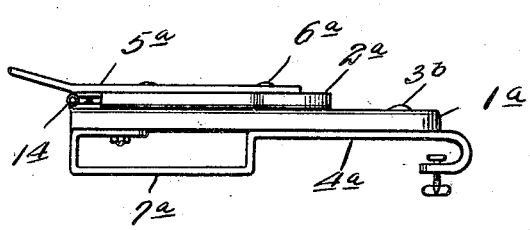
Figure 5 is a side elevation showing said seat in folded state.

When the modified seat is not in use it is folded as shown in Figure 5 so as to facilitate carrying of the same from place to place.

Figure 8:
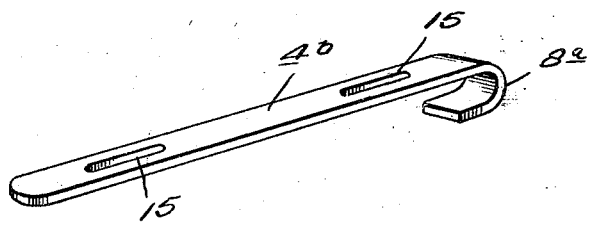
Figure 8 is an enlarged perspective of one of the anchoring bars thereof.

In the modification shown in Figures 6 to 8, the anchor bars $4^b$ are longitudinally slotted at 15 for the adjustable connection thereof to the seat body $1^b$ by headed bolts or screws 16 and by bolts 17 and wing nuts 18 so that their hook-shaped ends $8^a$ may be strongly held in engagement with the innermost portion 12 of a window sill. The support $7^b$ of the said modification is formed by a wooden block screwed or otherwise fixed to the underside of the body $1^b$ and adapted to abut solidly against the sill shoulder as shown in Figure 6 so as to assure the hooks $8^a$ remaining in engagement with the sill portion 12. The back $2^b$ of said modification is connected at $6^b$ to upwardly extending arms $5^b$ at the outer ends of bars $4^c$ fixedly connected to the body 1ᵇ at the underside thereof.

The modified seat of Figures 6 to 8 is manifestly possessed of all the practical advantages hereinbefore ascribed to the embodiment shown in Figures 1 to 3.

I have entered into a detailed description of the construction and relative arrangement of the parts embraced in the present and preferred embodiments of my invention in order to impart a full, clear and exact understanding of the said embodiments. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

A safety seat for window cleaners comprising a body, a back hinged to the body, anchor means connected with the body and having an integral hook to connect the body with the innermost edge portion of a window sill and also having an integral deflected pendent portion to rest in superimposed relation on the outer portion of a window sill; the outer portion of said anchor means being flush with the outer edge of the body, and an arm fixed to the outer side of the back and extending beyond the hinged edge thereof and arranged when the back is in use to bear against the outer portions of the body and anchor means.

In testimony whereof, I affix my signature.

JOSEPH BADAGLIACCA.